United States Patent [19]

Chang et al.

[11] 4,194,072

[45] Mar. 18, 1980

[54] FLAME RETARDANT NYLON COMPOSITIONS

[75] Inventors: Eng P. Chang, Grand Island; Charles S. Ilardo; Eugene L. Slagowski, both of Tonawanda, all of N.Y.

[73] Assignee: Hooker Chemicals & Plastics Corp., Niagara Falls, New York

[21] Appl. No.: 948,066

[22] Filed: Oct. 2, 1978

[51] Int. Cl.$^2$ ............................................. C08L 77/02
[52] U.S. Cl. ............................. 525/432; 260/45.7 R; 260/45.75 B; 260/45.75 P; 260/45.75 W
[58] Field of Search .................................. 260/857 TW

[56] References Cited

U.S. PATENT DOCUMENTS

| | | | |
|---|---|---|---|
| 3,403,036 | 9/1968 | Hindersinn | 260/45.75 B |
| 3,418,199 | 12/1968 | Anton et al. | 428/395 |
| 3,607,610 | 9/1971 | Fukuma | 260/857 TW |
| 3,779,853 | 12/1973 | Olson | 260/857 TW |
| 3,864,302 | 2/1975 | Foley | 260/37 N |
| 4,062,819 | 12/1977 | Mains | 260/857 TW |
| 4,076,682 | 2/1978 | Theyson | 260/37 N |

FOREIGN PATENT DOCUMENTS

| | | | |
|---|---|---|---|
| 2550803 | 5/1976 | Fed. Rep. of Germany | 260/857 TW |
| 46-5538 | 2/1971 | Japan | 260/857 TW |

OTHER PUBLICATIONS

Chemical Abstracts, vol. 86, No. 91118j Ger. Offen 2,530,377, W. Rolf.
Chemical Abstracts, vol. 87, No. 6950c, Ger. Offen 2,554,218, Leutner, Bernd et al.
Chemical Abstracts, vol. 87, No. 103,051T, Japan Kokai 77 60,844, Iida, Hiroshi et al.

*Primary Examiner*—Paul Lieberman
*Attorney, Agent, or Firm*—Peter F. Casella; William J. Crossetta, Jr.; Arthur S. Cookfair

[57] ABSTRACT

Flame retardant nylon compositions having improved physical properties and excellent molding characteristics comprise a mixture of about 45 to about 70 weight percent of nylon 6 or nylon 66 or mixture thereof; about 15 to about 25 percent of nylon 612; about 2 to about 10 percent of iron oxide, antimony oxide or zinc oxide or mixture thereof; and about 10 to about 25 percent of bis(hexachlorocyclopentadieno)cyclooctane.

12 Claims, No Drawings

FLAME RETARDANT NYLON COMPOSITIONS

BACKGROUND OF THE INVENTION

This invention relates to flame retardant nylon compositions having improved physical properties and excellent molding characteristics.

Nylons represent a family of commercially available polymers characterized by the presence of recurring amide groups in the polymer chain and generally noted for their excellent physical properties for a variety of end uses, including the formulation of molding compositions. Nylon 6, produced by polymerization of ε-caprolactam and Nylon 66, produced by the condensation reaction of adipic acid and hexamethylenediamine account for the major share of commercial nylon molding compositions.

It is known that the fire retardancy of some nylon compositions may be enhanced by the incorporation therein of various chlorinated organic fire retardants, often in combination with a suitable metal oxide, such as a zinc or antimony oxide. A particularly effective fire retardant for Nylon 6 and Nylon 66 is 1,4,7,10-dimethanocycloocta-1,2,3,4,7,8,9,10,13,13,14,14-dodecachloro-1,4,4a,5,6,6a,7,10,10a,11,12,12a-dodecahydro[1,2,5,6] dibenzene, characterized by the formula:

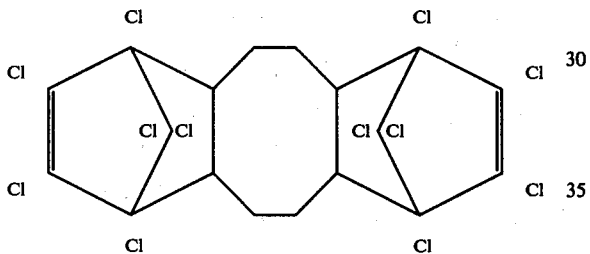

(For convenience, this compound will be referred to herein by the shorter title of bis(hexachlorocyclopentadieno)cyclooctane. The incorporation of bis(hexachlorocyclopentadieno)cyclooctane, optionally in combination with a suitable metal oxide, in nylon compositions, is disclosed in U.S. Pat. No. 3,403,036 to Hindersinn et al. It is known that such nylon compositions are characterized by excellent fire retardant properties and are generally satisfactory to excellent with respect to most of the desired physical properties sought in nylon compositions. However, it has been found that the incorporation of the aforementioned additives in Nylon 6 or Nylon 66 molding compositions results in an increase in the melt viscosity with a consequent decrease in the ease of processing in molding operations.

Accordingly, it is an object of this invention to provide nylon compositions particularly suited for use in molding processes. It is a further object to provide fire retardant nylon compositions characterized by improved processibility in molding operations, especially in injection molding operations, and improved physical properties of the final molded product.

SUMMARY OF THE INVENTION

It has now been found that nylon molding compositions comprising a major proportion of Nylon 6, Nylon 66 or mixtures thereof and a minor proportion of Nylon 612 are characterized by a melt viscosity which renders them particularly suitable for commercial molding processes, especially injection molding processes, to produce a final molded product having unexpectedly superior physical properties. Furthermore, it has been found that the incorporation therein of a minor proportion of the aforementioned bis(hexachlorocyclopentadieno) cyclooctane together with an oxide of iron, antimony or zinc provides a fire retardant nylon molding composition which, in comparison with the prior art fire retardant nylon molding compositions, provides a substantial improvement in melt viscosity as well as in physical properties of the final molded product. Nylon 612 is a commercially available polymer produced by the condensation reaction of dodecanedioic acid and hexamethylene diamine. The aforesaid fire retardant molding compositions in accordance with this invention comprise, in weight percent:

(A) about 45 to about 70 percent of Nylon 6 or Nylon 66, or mixtures thereof;
(B) about 15 to about 25 percent of Nylon 612;
(C) about 2 to about 10 percent of an oxide selected from the group iron oxide, antimony oxide, zinc oxide, and mixtures thereof;
(D) about 5 to about 30 percent of bis(hexachlorocyclopentadieno)cyclooctane.

The nylon compositions of this invention may be conveniently fabricated into various shapes or articles of manufacture using conventional techniques such as molding or casting and the like, with or without additional fire retardants, fillers, reinforcing agents or other additives. It has been found that the nylon compositions of this invention are characterized by a melt viscosity which, renders them particularly suitable for commercial molding processes, especially injection molding processes, and results in a final molded product having unexpectedly superior physical properties.

DESCRIPTION OF PREFERRED EMBODIMENTS

The preferred nylon molding compositions of this invention are those wherein Nylon 6 and/or Nylon 66 is present in a weight ratio of about 2.0 to about 5.0 and preferably about 3.0 to about 4.5 parts per part of Nylon 612. It has been found that within such range, nylon molding compositions may be formulated that exhibit not only a lower melt viscosity but in addition, are characterized by substantial improvements in physical properties of the final molded product.

To achieve the most advantageous physical properties in the fire retardant compositions of this invention it is preferred to vary the formulation depending on the use of Nylon 6 or Nylon 66 as the major component. Thus, the preferred fire retardant compositions wherein Nylon 6 is the major component comprise, in parts by weight, about 50 to about 65 parts of Nylon 6, about 10 to about 20 parts of Nylon 612, about 2 to about 10 parts of iron oxide or antimony oxide, and about 15 to about 20 parts of bis(hexachlorocyclopentadieno)cyclooctane. The preferred fire retardant composition wherein Nylon 66 is the major component comprise, in parts by weight, about 45 to about 70 parts of Nylon 66, about 10 to about 25 parts of Nylon 612, about 10 to about 25 parts of bis(hexachlorocyclopentadieno)cyclooctane and about 5 to about 10 parts of zinc oxide, iron oxide or antimony oxide.

The nylon and flame retardant components can be compounded to form an intimate mixture, suitable for molding, by various known methods. The components may be ground or pulverized and the powders mixed in a conventional fashion to form a blend suitable for molding techniques. Alternatively, the fire retardant components may be added and mixed with the molten polymer blend. The blend may then be molded, extruded, or otherwise formed into useful articles or shapes, and is particularly adaptable for injection molding techniques. Furthermore, various other additives may be incorporated into the blend such as lubricants, fillers, pigments, mold release agents, reinforcing agents, such as glass fibers and the like.

mine various physical properties. The nylon molding compositions were prepared as follows. The nylon components were ground to pass a 1.0 mm sieve, mixed, and the mixture dried at 120° C. for two hours, then extruded at about 230°–250° C. into a ribbon form. The extrudates were then ground into particles of about 6 mm diameter and again dried at 120° C. for 2 to 4 hours, then injection molded at about 230°–260° C. The injection molded bars were tested with the results as set forth in Table I, below.

TABLE I

| COMPOSITION/PROPERTY | UNITS | EXAMPLE NO. | | | | |
|---|---|---|---|---|---|---|
| | | 1 | 2 | 3 | 4 | 5 |
| Nylon 6 | % | 100 | — | — | 80 | — |
| Nylon 66 | % | — | — | 100 | — | 80 |
| Nylon 612 | % | — | 100 | — | 20 | 20 |
| Molding Parameters Cylinder | Temp. °C. | 260 | 232 | 274 | 243 | 260 |
| Injection Pressure | psi | | | | 10620 | 10600 |
| Impact (Notched) D256 | Ft.lb/in | 0.8 | 0.9 | 1.1 | 0.8 | 0.6 |
| HDT 66 psi | °C. | 157 | 118 | 213 | 152 | 218 |
| 264 psi | °C. | 60 | 51 | 62 | 53 | 63 |
| Tensile Strength (break) | psi | 6000 | 4500 | 6700 | 6300 | 10400 |
| Elongation (break) | % | 108 | 36 | 27 | 55 | 37 |
| Flexural Strength | psi | 13900 | 11100 | 15100 | 12600 | 15400 |
| Flexural Modulus | psi × $10^5$ | 2.72 | 2.49 | 3.37 | 2.75 | 3.66 |
| Apparent viscosity at 232° C. | | | | | | |
| at 3000 $sec^{-1}$ app. shear rate | poise | 740 | | | 600 | |
| at 2 × $10^6$ $dynes/cm^2$ shear stress | poise | 730 | | | 580 | |
| Apparent viscosity at 272° C. | | | | | | |
| at 3000 $sec^{-1}$ app. shear rate | poise | | | 630 | | 460 |
| at 2 × $10^6$ $dynes/cm^2$ shear stress | poise | | | 600 | | 340 |

The following specific examples are provided to further illustrate this invention and the manner in which it may be carried out. It will be understood, however, that the specific details given in the examples have been chosen for purpose of illustration and are not to be construed as a limitation on the invention. In the examples, unless otherwise indicated, all parts and percentages are by weight and all temperatures are in degrees Celsius.

EXAMPLE 1-5

A series of nylon molding compositions were prepared and injection molded in the form of ⅛"×½"×5" bars and the injection molded bars were tested to determine

EXAMPLES 6-13

A series of fire retardant nylon molding composition were prepared and injection molded in the form of ⅛"×½"×5" bars. The preparation of the molding compositions was carried out following the procedure of Examples 1-5 except that powdered fire retardant additives (bis(hexachlorocyclopentadieno)cyclooctane and metal oxide) were blended with the nylon particles following the initial grinding. The injection molded bars were tested to determine fire retardance and various physical properties, with the results as set forth in Tables II and III, below.

TABLE II

| COMPOSITION/PROPERTY | UNITS | EXAMPLE NO. | | | |
|---|---|---|---|---|---|
| | | 6 | 7 | 8 | 9 |
| Nylon 66 | % | 84 | 67 | 70 | 49 |
| Nylon 612 | % | — | 17 | — | 21 |
| Nylon 6 | % | — | — | — | — |
| bis(hexachlorocyclopentadieno)cyclooctane | % | 10 | 10 | 24 | 24 |
| $Fe_2O_3$ | % | 6 | 6 | — | — |
| $Sb_2O_3$ | % | — | — | — | — |
| ZnO | % | — | — | 6 | 6 |
| Molding Parameters Cylinder Temp | °C. | 274 | 257 | 282 | 257 |
| Injection Press. | psi | 12500 | 12500 | 12500 | 12500 |
| Oxygen Index | % | 31.3 | 32.5 | 31.1 | 28.6 |
| ⅛" UL-94 Testing | — | | | | |
| Total 10 flameout | sec. | 10.4 | 15.0 | 13.3 | 41.4 |
| Average 5 afterglow | sec. | No | No | No | No |
| Drip (cotton) | — | No | No | No | No |
| Class | | V-O | V-O | V-O | V-O |
| Impact (Notched) D256 | ft.lb/in. | 0.5 | 0.5 | 0.6 | 0.4 |
| HDT 66 psi | °C. | 204 | 190 | 219 | 193 |
| 264 psi | °C. | 72 | 71 | 75 | 89 |
| Tensile Stength (break) | psi | 7500 | 6200 | 7200 | 3800 |
| Tensile Modulus | psi × $10^5$ | 5.81 | 5.85 | 5.29 | 3.7 |
| Elongation (break) | % | 2.5 | 1.9 | 4.2 | 1.8 |
| Flexural Strength | psi | 12200 | 13900 | 14600 | 12400 |
| Flexural Modulus | psi × $10^5$ | 4.79 | 5.23 | 5.30 | 5.44 |

TABLE III

| COMPOSITION/PROPERTY | UNITS | EXAMPLE NO. 10 | 11 | 12 | 13 |
| --- | --- | --- | --- | --- | --- |
| Nylon 6 | % | 75 | 60 | 75 | 60 |
| Nylon 612 | % | — | 15 | — | 15 |
| bis(hexachlorocyclopentadieno)cyclooctane | % | 20 | 20 | 16.7 | 16.7 |
| $Fe_2O_3$ | % | — | — | 8.3 | 8.3 |
| $Sb_2O_3$ | % | 5 | 5 | — | — |
| Molding Parameters Cylinder Temp | °C. | 260 | 235 | 260 | 232 |
| Injection Press. | psi | 12500 | 12500 | 12500 | 12500 |
| Oxygen Index | % | 29.4 | 30.2 | 32.2 | 30.5 |
| ⅛" UL-94 Testing | — | | | | |
| Total 10 flameout | sec. | 10 | 10 | 7.7 | 20.8 |
| Average 5 afterglow | sec. | 0 | 0 | 0 | 0.5 |
| Drip (cotton) | — | No | No | No | No |
| Class | — | V-O | V-O | V-O | V-O |
| Impact (Notched) D256 | ft.lb/in. | 0.5 | 0.6 | 0.9 | 0.6 |
| HDT 66 psi | °C. | 175 | 178 | 156 | 164 |
| 264 psi | °C. | 54 | 73 | 58 | 63 |
| Tensile Strength (break) | psi | 5100 | 7200 | 7100 | 6700 |
| Tensile Modulus | $psi \times 10^5$ | 3.07 | 4.25 | 5.02 | 3.9 |
| Elongation (break) | % | 9.3 | 4.3 | 4.7 | 3.7 |
| Flexural Strength | psi | 9100 | 13400 | 14300 | 14900 |
| Flexural Modulus | $psi \times 10^5$ | 2.71 | 4.99 | 4.18 | 4.91 |

What is claimed is:

1. A flame retardant nylon composition comprising in weight percent, a blend of about 45 to about 70 percent of homopolymers of nylon 6 or nylon 66, or mixture thereof; about 15 to about 25 percent of nylon 612 homopolymer; about 2 to about 10 percent of iron oxide, antimony oxide, zinc oxide, or mixture thereof; and about 10 to about 25 percent of bis(hexachlorocyclopentadieno)cyclooctane.

2. A flame retardant nylon composition according to claim 1, comprising, in weight percent, about 50 to about 65 percent of nylon 6, about 10 to about 20 percent of nylon 612; about 2 to about 10 percent of an oxide from the group iron oxide and antimony oxide; and about 15 to about 20 percent of bis(hexachlorocyclopentadieno)cyclooctane.

3. A flame retardant nylon composition according to claim 2 wherein said oxide is iron oxide.

4. A flame retardant nylon composition according to claim 3 wherein said iron oxide is $Fe_2O_3$.

5. A flame retardant nylon composition according to claim 2 wherein said oxide is antimony oxide.

6. A flame retardant nylon composition according to claim 1 comprising, in weight percent, about 45 to about 70 percent of nylon 66; about 10 to about 25 percent of nylon 612; about 5 to about 10 percent of an oxide from the group zinc oxide, antimony oxide and iron oxide; and about 10 to about 25 percent of bis(hexachlorocyclopentadieno)cyclooctane.

7. A flame retardant nylon composition according to claim 6 wherein said oxide is zinc oxide.

8. A flame retardant nylon composition according to claim 6 wherein said oxide is iron oxide.

9. A flame retardant nylon composition according to claim 8 wherein said iron oxide is $Fe_2O_3$.

10. A nylon molding composition comprising, in parts by weight, a blend of about 2.0 to about 5.0 parts of a homopolymer of nylon 6, nylon 66 or mixture thereof per one part of nylon 612 homopolymer.

11. A nylon molding composition according to claim 10 comprising about 2.0 to about 5.0 parts of nylon 6 per one part of nylon 612.

12. A nylon molding composition according to claim 10 comprising about 2.0 to about 5.0 parts of nylon 66 per one part of nylon 612.

* * * * *